*INVENTOR.*
LESLIE M. CURTIS
BY
*ATTORNEY*

United States Patent Office 2,986,184
Patented May 30, 1961

2,986,184
SHANK GRIPPING WIRE FRAME CLAMP
Leslie M. Curtis, 195—20 56th Ave., Flushing, N.Y.
Filed May 12, 1959, Ser. No. 812,691
1 Claim. (Cl. 144—303)

This invention relates to clamps generally known as C clamps in the machine shop and woodworking trades used for holding parts in a fixed position or to glue parts together under pressure. The conventional C clamp consists of a C-shaped frame having a hole on one end through which a screw is inserted, there being a small rotatable disk on the end of the screw permitting the screw to be turned to narrow the opening of the clamp while gripping the part to be held by the clamp. In such clamps the length of the screw has to exceed the width of the opening of the clamp to permit gripping of any intermediate sizes and therefore these clamps require a substantial amount of turning of the screw to obtain the required adjustment for the work at hand.

The purpose of the present invention is to provide a clamp of this type which requires only a very short screw, yet permits the quick and easy clamping of parts of any width within the limit of the size of the clamp. A further object is to provide a C clamp which can be adjusted quickly and easily to any width without having to compensate the difference in width by changing the length of the screw. A still further object is to provide a clamp of this type which is inexpensive to manufacture and simple and quick to operate.

Other advantages and novel features of my invention will be apparent from the following specification if considered in conjunction with the attached drawings in which.

Like numerals refer to like parts throughout the various figures.

Figure 1:
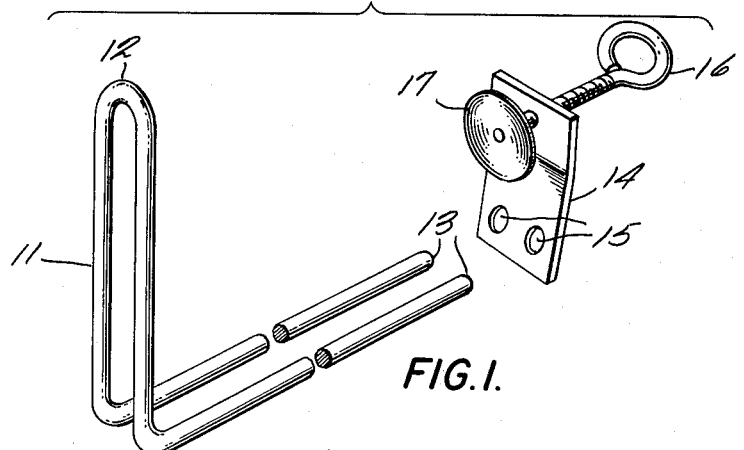
Fig. 1 is a view in perspective of my new clamp in disassembled position.

As shown in Fig. 1, my clamp consists of two parts: a double L-shaped frame formed from wire, having loop 12 on one end and two free ends 13 on the other. The other part of the clamp consists of a slightly bent plate 14, having two holes 15 corresponding to the free ends 13 of the frame and carrying the screw 16 with the rotatable disk 17 mounted on the end of the screw. The holes 15 are slightly elliptical permitting the plate 14 to move within relatively narrow limits when the plate is inserted into the free ends 13 of the frame, and it is bent in such a manner that the portion holding the screw should be approximately parallel with the curved end of the frame when the plate is in its extreme position away from the frame as permitted by the elliptical openings 15.

In actual operation the plate through holes 15 is inserted into the frame through the frame's free ends 13 and is easily slidable along the frame from the open ends until the curved bottom. The article to be held is placed against the curved bottom of the frame 11 and then the plate 14 is pushed down until the rotatable disk 17 touches the surface of the article to be clamped. Once this position is reached a short turn of the screw 16 is sufficient to grip the article firmly because under pressure the elliptical holes 15 take a firm grip on the frame stopping it from sliding.

Figure 2:
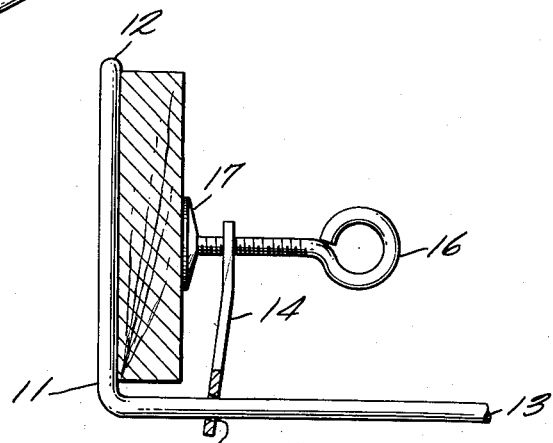
Fig. 2 is a side elevation of my new clamp, showing the clamp gripping a thin piece of wood.
Figure 3:
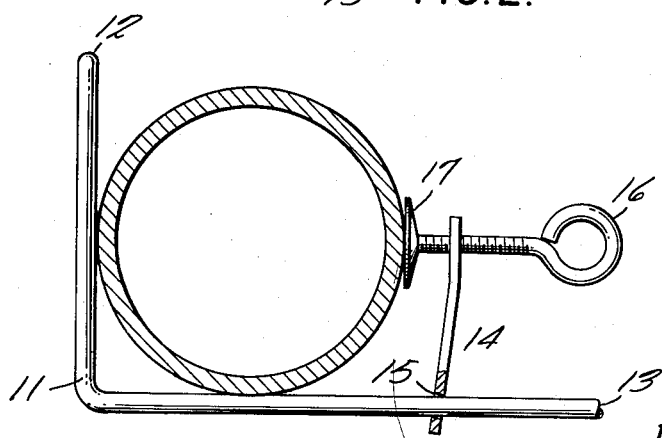
Fig. 3 is a side elevation of my clamp shown gripping a pipe of larger diameter.

This gripping position is shown in Fig. 2 with a small piece of wood and similarly in Fig. 3 with a larger piece of pipe. In both instances the turning of the screw 16 has the effect of pressing the elliptical openings 15 on plate 14 against the side of the wire from which frame 11 has been formed, thereby creating a firm hold in a given position. On the other hand, when the article held by the clamp is released by turning the screw 16, counter-clockwise, both the clamped article and the plate on the frame become loose at the same time, permitting the frame to slide again freely alongside the two wires forming the frame.

It is obvious therefore the clamping and unclamping can be done easily and quickly with not more than one or two turns of the screw regardless of the various width of the items to be clamped, making this operation much faster and reducing at the same time the length of the screw required.

Of course, changes in arrangement of various parts may be made, such as using a flat piece of angle iron instead of the wire formed frame with one opening instead of two, and equivalents may be substituted without departing from the spirit of the invention as described in the following claim.

I claim as my invention:

A clamp comprising an L shaped wire frame and a plate slidably mounted on said frame, said frame comprising parallel vertical portions looped together at their upper ends and forming a fixed jaw, and parallel horizontal portions extending in the same horizontal plane from the lower ends of the respective vertical portions, said horizontal portions being of circular cross section and having free outer ends, said plate comprising angularly related upper and lower portions, the lower plate portion being formed with a pair of elliptical openings for respectively receiving the horizontal portions of said frame and to be slidable thereon towards and away from said fixed jaw, a screw threaded through the upper plate portion and carrying a clamping disc in opposed relation to said fixed jaw, said plate being slidable on said horizontal frame portions to selected positions thereon and adapted to be canted relative thereto to dispose the upper plate portion in parallel relation to the fixed jaw and to lock said plate to said horizontal frame portions.

References Cited in the file of this patent

UNITED STATES PATENTS

| | | |
|---|---|---|
| 153,206 | Van Wagoner | July 21, 1874 |
| 1,020,129 | Crandal | Mar. 12, 1912 |
| 1,371,080 | Dupuy | Mar. 8, 1921 |
| 1,631,209 | Jewell | June 7, 1927 |
| 1,659,342 | Wetzler | Feb. 14, 1928 |
| 2,061,937 | Fay | Nov. 24, 1936 |
| 2,883,677 | Geen | Apr. 28, 1959 |